United States Patent Office 3,312,405
Patented Apr. 4, 1967

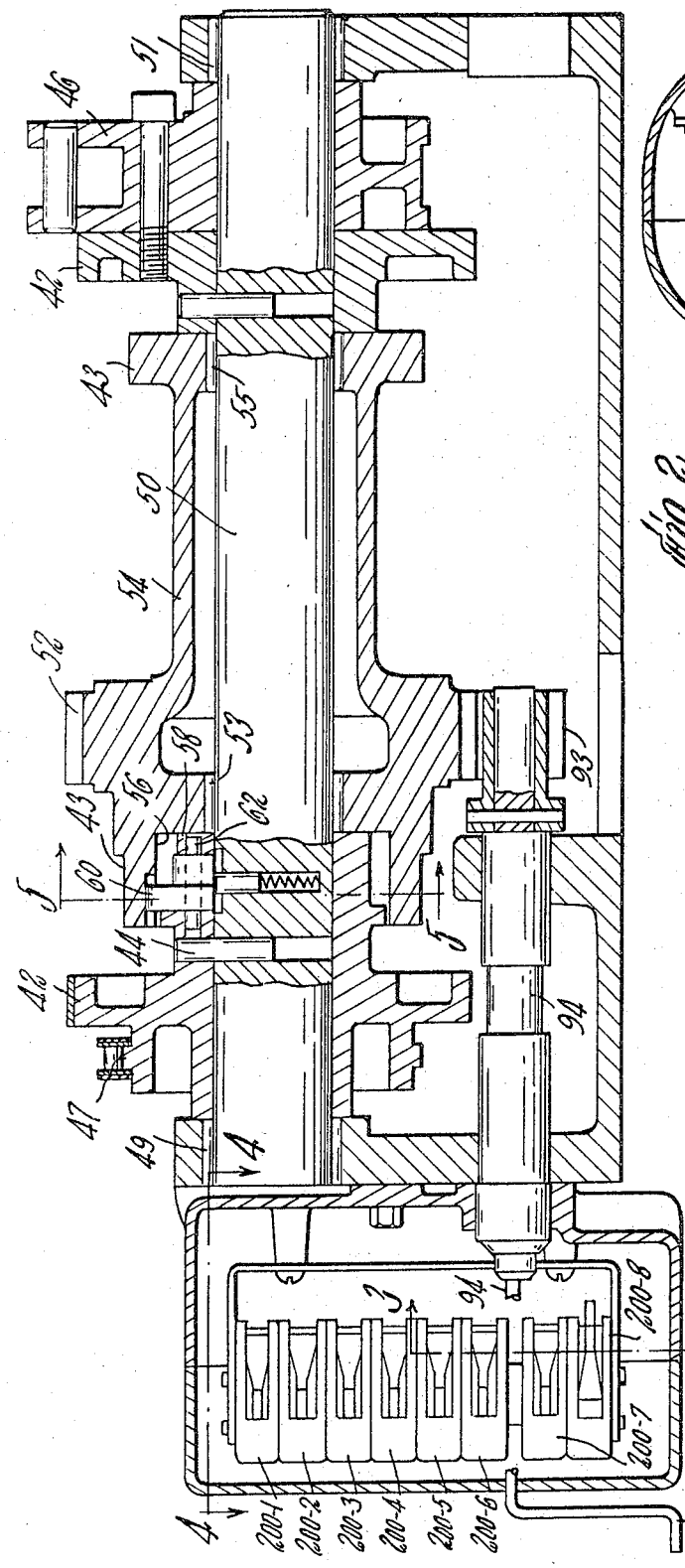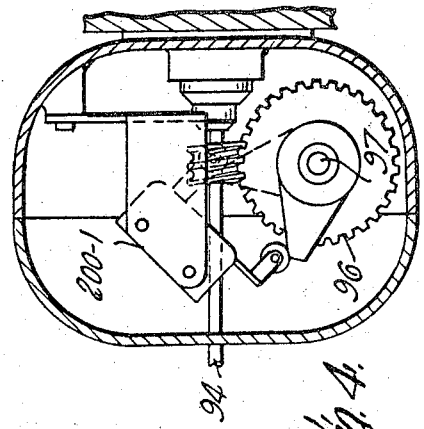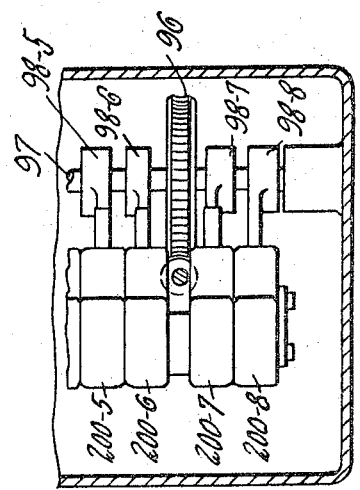

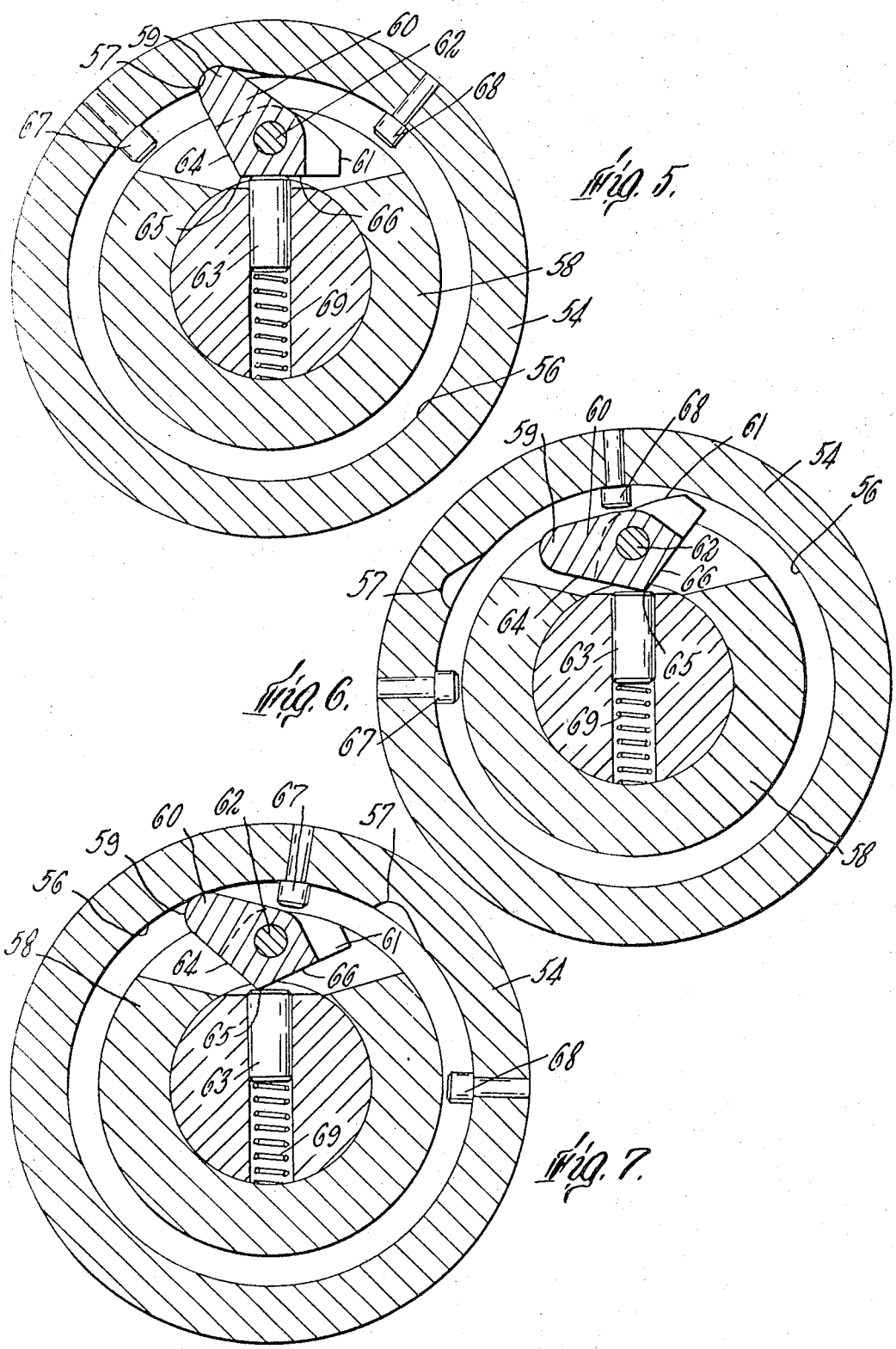

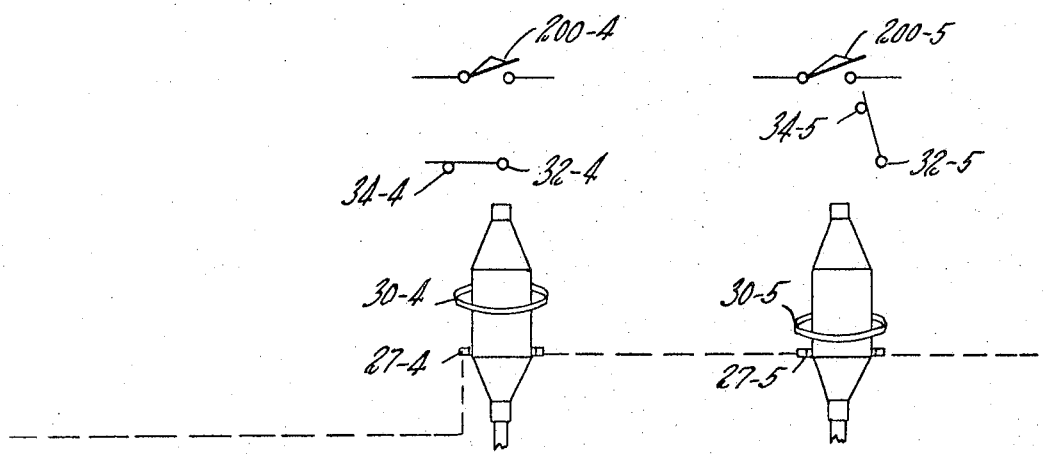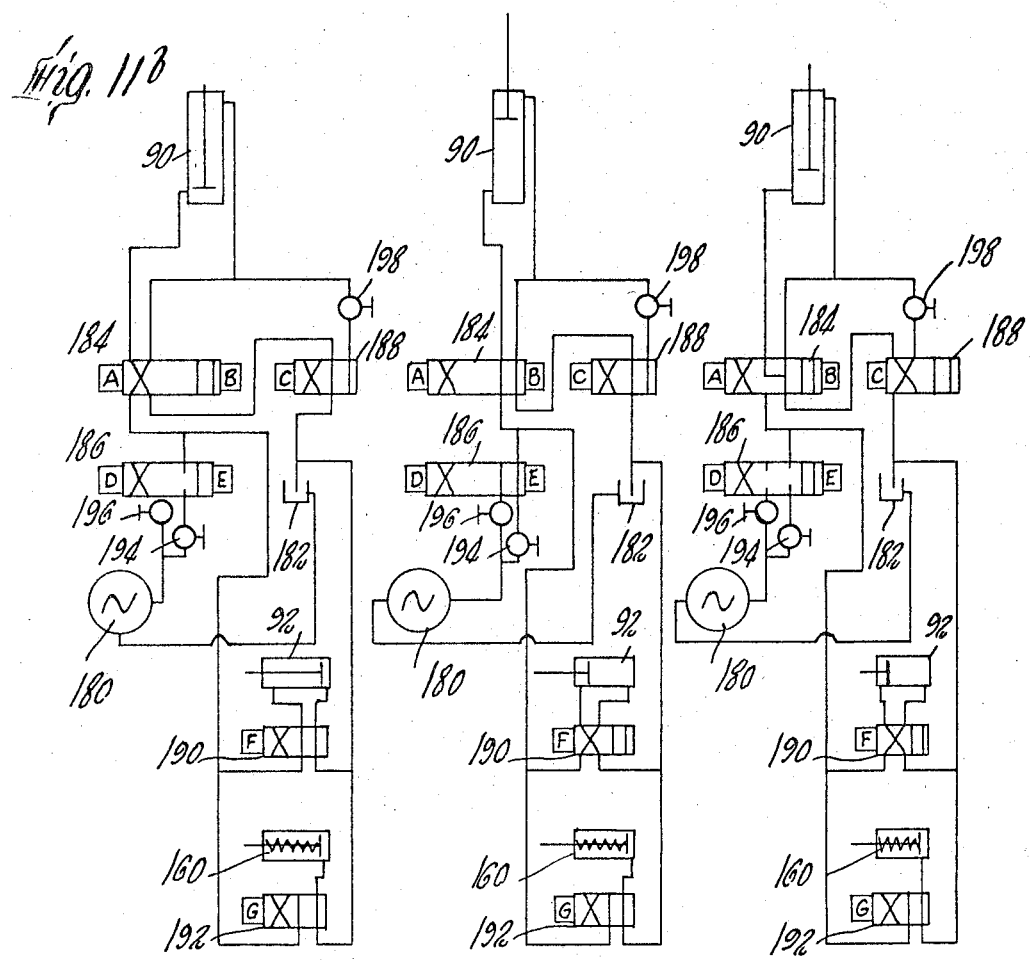
Fig. 11B
Fig. 15.   Fig. 16.   Fig. 17.

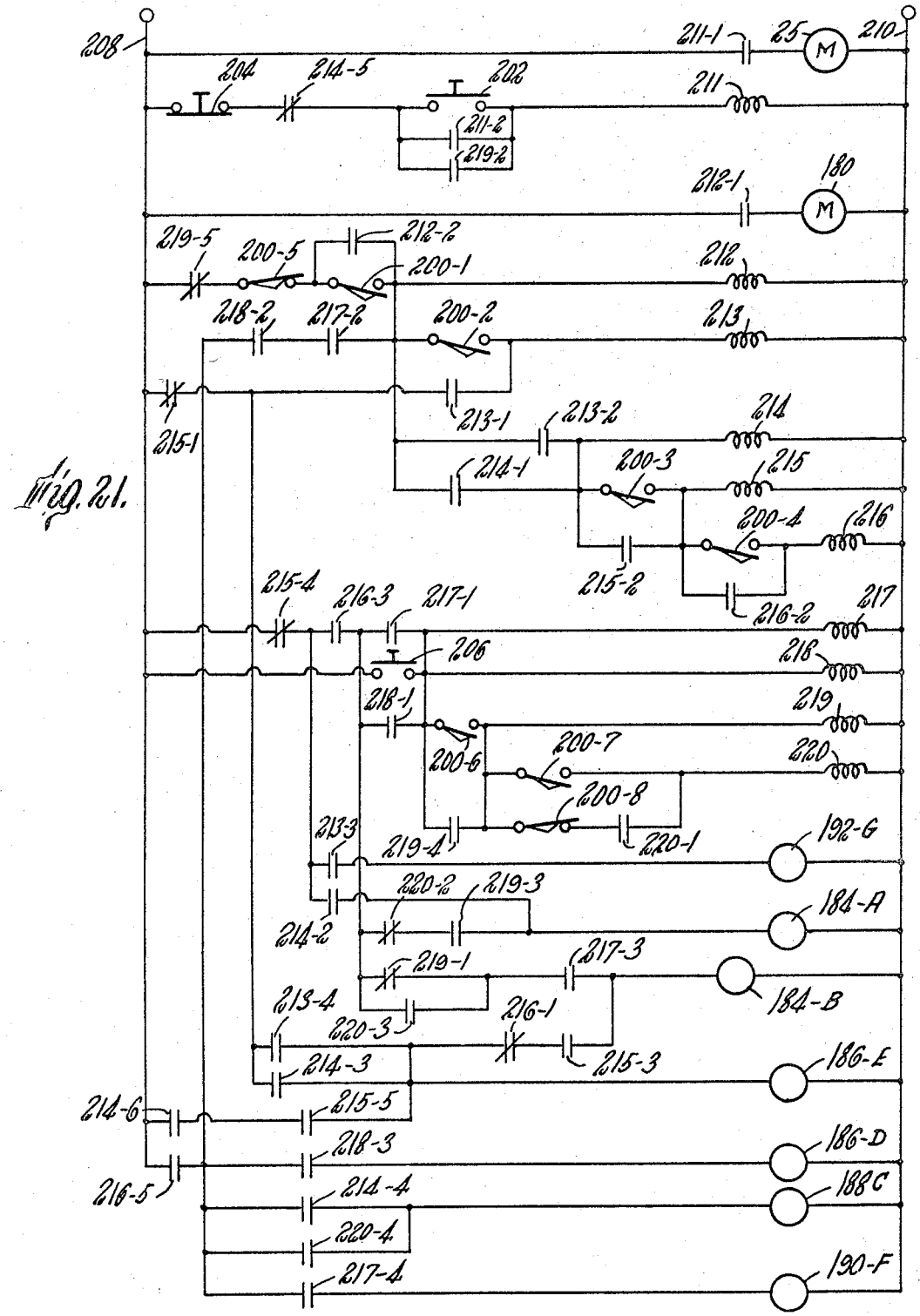

3,312,405
SPINNING FRAME CONTROL MEANS
Lester W. Pray, Gordon C. Anderson, and James Waddington, Clemson, S.C., assignors to Maremont Corporation, Chicago, Ill., a corporation of Illinois
Filed Oct. 7, 1964, Ser. No. 402,108
13 Claims. (Cl. 242—26.4)

This application is a continuation-in-part of our earlier application Ser. No. 310,109, filed Sept. 19, 1963, now Patent No. 3,231,209, dated Jan. 25, 1966. This invention relates to textile fiber spinning and twisting frames and the like, having yarn guiding and winding elements which are vertically traversed with relation to bobbin supporting spindles in accordance with a rising builder pattern, and more particularly to mechanisms on such frames for operating such yarn guiding and winding elements at the conclusion and initiation of bobbin winding, for replacement of full with empty bobbins as well as for other purposes.

With the introduction of apparatus for automatically doffing full bobbins from spinning and twisting frames and replacing them with empty bobbins, there has been a need for a spinning and twisting frame which will automatically ready its yarn guiding and winding elements and then stop them for removal of the full bobbins and have the ability to restart after replacement of the full bobbins with empty ones without the necessity of starting the winding operation of any of the individual yarns by piecing up.

In addition, there has also been a need for operating the spinning or twisting frame at the conclusion of the winding cycle to produce a bobbin tip wind if the full bobbins are to be used in automatic rewinding equipment, such being accomplished by raising the spinning rings to an unusually high position for a time sufficient to add a few turns of yarn to the upper tip of the bobbin before lowering the spinning rings for spindle bottom winding and doffing.

Although spinning and twisting frames have been described as having one or more of the above described functions, they have in general been deficient in several respects, principally in their inability to restart without breaking an undue number of yarn ends; making extensive piecing up necessary, but also in their mechanical complexity, making them difficult to manufacture and to keep running in production.

Accordingly, it is a major object of the present invention to provide mechanism for a spinning or twisting frame or the like having a fully automatic bobbin replacement cycle, with bobbin tip wind if desired.

It is another object of the invention to provide in such a frame, novel mechanism for lowering the balloon control rings relatively to the spinning rings for full bobbin removal, useful in manually operated as well as automatically operated frames.

It is another object of the invention to provide novel mechanism for moving the thread guides to an out of the way position for full bobbin removal.

It is still another object of the invention to provide a novel mechanism for automatic bobbin tip winding and resetting therefrom.

In general, the invention accomplishes these and other objects automatically by raising the spinning rings to a tip winding position, if such be desired, followed by lowering the spinning rings beyond their usual bottom winding position to wind a few turns of yarn around the bottom of the spindles beyond the lower ends of the bobbins for restarting the winding on an empty bobbin, and, for bobbin clearance, lowering the balloon control rings as well to a position close to the lowered spinning rings and preferably moving the thread guides to a position clear of the bobbins so that the full bobbins may be readily removed. Upon restarting with empty bobbins, the spinning rings, balloon control rings and thread guides are automatically restored to their starting positions. The spindle bottom wind permits bobbin winding to begin without piecing up, and the additional use of rapidly traversing jogging of the spinning rings and bobbins aids to a substantial degree in reducing yarn breakage during restarting.

For the purpose of more fully explaining the above and further objects and features of the present invention, reference is now made to the following detailed description of a preferred embodiment thereof, together with the accompanying drawings, in which:

FIG. 2 is a side section of the windlass portion of the frame of FIG. 1 including the electrical switch mechanism operated thereby;

FIGS. 3 and 4 are detail views of the switch mechanism of FIG. 2;

FIGS. 5, 6 and 7 are cross sections of the windlass of FIG. 2 taken on the lines 5—5 thereof;

Figure 1:
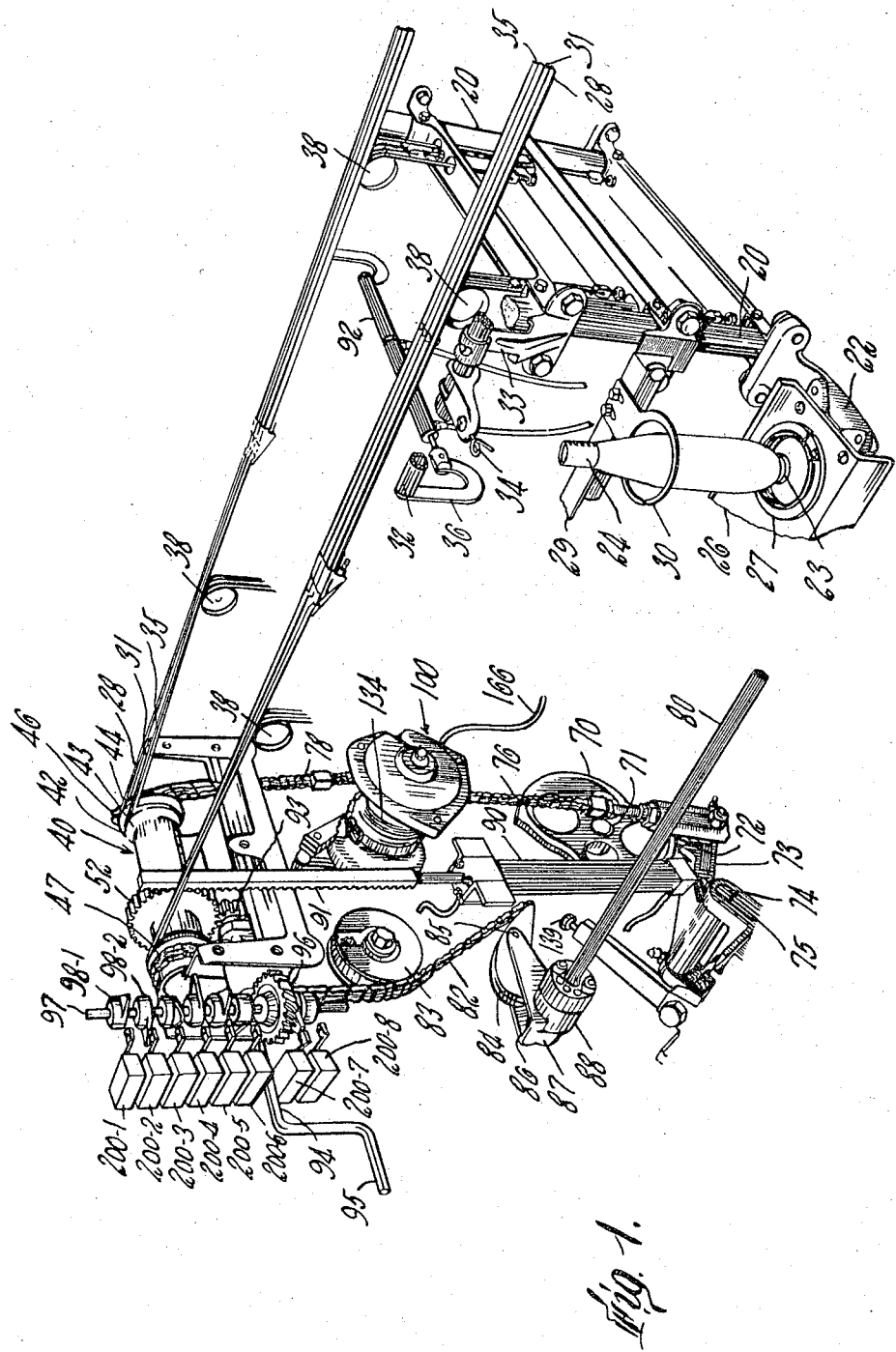
FIG. 1 is a diagramatic view in perspective of a spinning frame embodying the invention.
Figure 8:
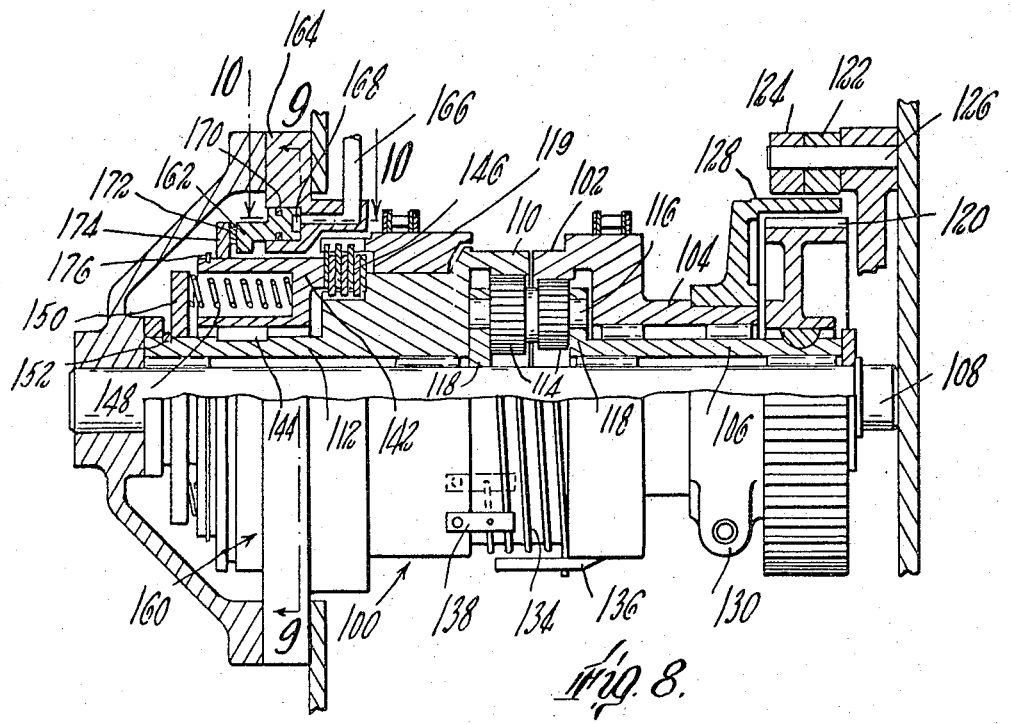
FIG. 8 is a side section of the pick mechanism portion of the frame of FIG. 1 including the hydraulic clutch thereof.
Figure 9:
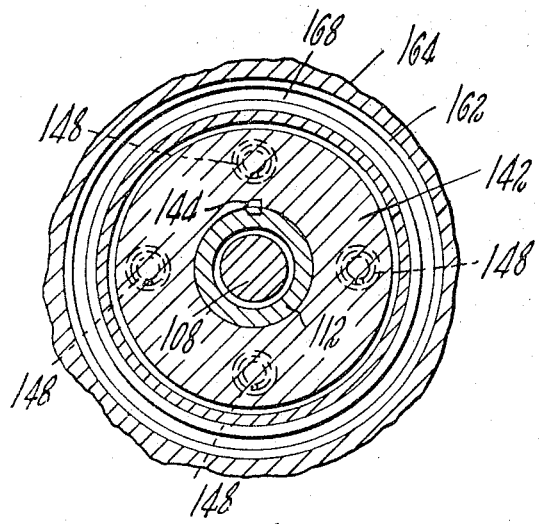
Figure 10:
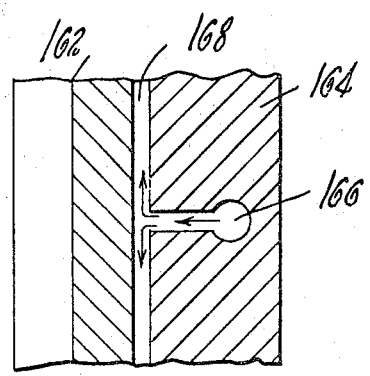
Figure 11A:
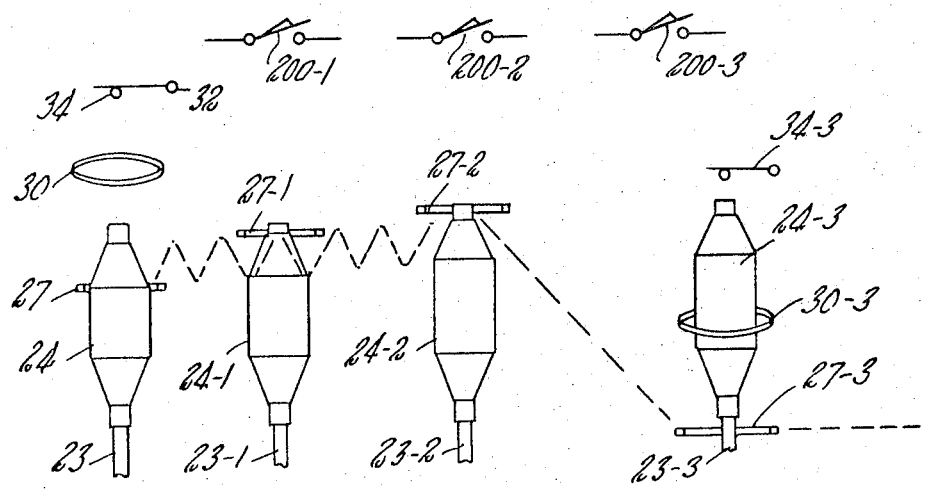

FIGS. 9 and 10 are cross sections of the pick mechanism of FIG. 8, taken on the lines 9—9 and 10—10 thereof;

FIGS. 11a, b and c comprise a sequence diagram illustrating the complete sequence of operation of the yarn guiding and winding elements of the frame of FIG. 1;

FIGS. 12 through 20 illustrate the hydraulic circuit of the frame of FIG. 1 throughout its complete sequence of operation; and FIG. 21 is an electrical circuit diagram of the frame of FIG. 1.

*General*

As shown in the drawings, especially in regard to the overall schematic showing of FIG. 1, the invention is herein disclosed as embodied in a spinning frame which may be of the type generally shown in Patent No. 2,770,093, for example, consisting of an elongated frame structure having at each side thereof vertical posts 20 extending upwardly from duplicate fixed spindle rails 22 on which are mounted a series of spindles 23 on which bobbins 24 are carried. A main frame motor 25 (FIG. 21) is provided for driving spindles 23 in the usual manner. The spindles together with their drive mechanism are well known and form specifically no part of the present invention, and need not be further described.

The movable yarn traversing guiding and control elements by means of which the yarns are guided for winding on the bobbins on the spindles comprise, associated and mounted for vertical movement along posts 20 with each spindle rail 22, a spinning ring rail 26 having mounted thereon along the length of the machine a series of spinning rings 27, a control ring support bar 29 on which are mounted a series of control rings 30, and a thread guide supporting rod 32 rotatably mounted in brackets 33 on which rod is mounted a series of thread guides 34.

The spinning ring rail 26 is supported at intervals along its length by means of tapes 28 which extend along the length of the machine and are provided at intervals with extensions passing around idler pulleys 38. Each tape 28 is secured at the base end to a pulley 42 mounted on a windlass, generally designated 40 and hereinafter more fully explained, which extends transversely across one end of the frame.

The control ring bar 29 is similarly supported by tapes 31 which at their base ends are secured to pulleys 43 mounted on windlass 40 and toward their outer ends are similarly provided with extensions which pass around pulleys 38.

The thread guide supporting rod brackets 33 are mounted on tapes 35, each of which also extends along the length of the machine and is provided at intervals with extensions which pass around pulleys 38. The tapes 35 are secured at their base ends to pulleys 44 mounted on windlass 40.

The illustrated machine is provided with a builder mechanism for producing the traversing movement of the yarn guiding and control elements which is similar in many respects to that shown in Anderson et al. Patent No. 3,072,350, dated Jan. 8, 1963, for Builder Mechanism. As generally shown in FIG. 1, the builder mechanism comprises a builder cam 70 mounted on a builder cam shaft 71 driven by main frame motor 25 and adapted to be engaged by a follower 72 on a builder cam lever 73 extending horizontally beneath the builder cam. The cam lever turns about a pivot 74 on a machine bracket 75, and is connected with the lower end of an adjustable link chain 76. At its upper end the chain 76 is connected with a pick mechanism, generally designated 100 and hereinafter more fully explained, which is in turn connected by means of a link chain 78 with a pulley 46 secured to the windlass 40.

There is also connected to the windlass 40 the compensating tension assembly including a torsion bar 80 which acts to rotate the windlass in a direction counter to the thread guide, control ring and spinning ring supporting tapes. Said compensating tension assembly comprises a chain 82 which is connected at its upper end to a pulley 47 mounted on windlass 40. The chain 82 extends downwardly around a guide roller 83 and is connected at its lower end to a cam member 84 which is adjustably mounted on a pivot pin 85 between a pair of arms 86 formed on a bracket 87 which is rotatably supported on a bearing member 88 and is rigidly secured at one end to torsion bar 80 to rotate therewith about the torsion bar axis. The torsion bar 80 is placed under a twisting or torsion strain which serves to exert a downward bias on the chain 82 sufficient to overbalance the bias of the several tapes attached to windlass 40. An adjustable stop 139 is provided for cam member 84.

The builder mechanism above generally referred to is arranged to operate in the following manner:

The builder shaft 71 and cam 70 are positively driven by motor 25 to produce a cyclical up-and-down movement of the build cam follower lever 73 to produce a reciprocatory movement of the spinning ring rail 26, control ring bar 29 and thread guide rod 32 with a recurring winding pattern. At regular intervals during this operation, the pick mechanism 100 is operated to increase slightly the length of chain 78 and thereby to gradually lift the reciprocating pattern of winding effected by the operation of the builder cam follower 72.

For a more complete illustration and description of the builder mechanism, reference may be had to the Anderson et al. Patent No. 3,072,350, above referred to.

Invention

Figure 11C:
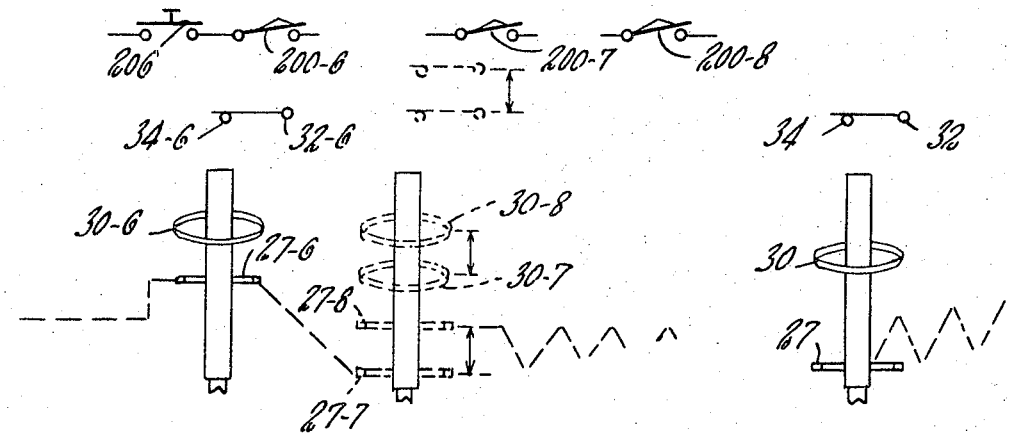

According to the present invention, novel means including hydraulic and mechanical operating means with their controls are provided for operating the spinning frame of the invention at the conclusion and initiation of the operation of winding a bobbin 24. The resulting functions at the conclusion of bobbin winding may include raising the spinning rings 27 for tip winding if desired, followed by lowering the spinning rings beyond their usual bottom winding position to wind a few turns of yarn around the bottom of the spindle 23, and then, for bobbin removal, further lowering the control rings 30 to a position close to the lowered spinning rings and tipping back the thread guides 34. Upon restarting the spinning frame with empty bobbins, the spinning rings, control rings and thread guides are automatically restored to their initial bobbin winding positions, the spindle bottom wind and jogging making possible initiation of winding without piecing up. This complete sequence is illustrated in FIGS. 11a–c.

As shown in FIG. 1, the means for accomplishing this sequence includes a main hydraulic piston and cylinder 90 having a rack 91 for moving windlass gear 52 mounted on windlass 40, a double ended hydraulic thread guide piston and cylinder 92 having its relatively movable ends connected to arms 36 of thread guide rod 32 for moving thread guides 34 from a horizontal to a generally vertical position, a hydraulic clutch control of pick mechanism 100 through its inlet 166, and electric control means including a multiple cam driven switch mechanism including switches 200–1 through 8 driven from windlass gear 52 by means of transverse shaft 94 having a gear 93 cooperating with windless gear 52 and cooperating gears 96 driving vertical cam shaft 97 on which switch cams 98–1 through 8 are mounted. Handle 95 is provided for manual operation of windlass gear 52.

Windlass

The novel windlass 40 of the present invention, best shown in FIGS. 2 to 7, differs from heretofore known windlasses to provide for movement of control rings 30 independently of the movement of the spinning ring rail 26 and thread guide rod 32 to a lowered position with respect thereto for removal of a full bobbin from its spindle.

In this regard, the windlass of the present invention has a main shaft 50, suitably mounted for oscillation in bearings 49, 51 on the spinning frame, with a countershaft in the form of a central sleeve 54 rotatably mounted thereon by spaced bearings 53, 55. The ring rail pulleys 42, thread guide pulleys 44, pick motion chain pulley 46 and torsion bar chain pulley 47 are all mounted on windlass shaft 50 in rotatable positions. Windless gear 52 and control ring pulleys 43 are mounted on rotatable windlass sleeve 54.

A latch mechanism is provided for rotating sleeve 54 for oscillation in synchronism with windlass shaft 50 during normal operation of the spinning frame and for rotating sleeve 54 independently of shaft 50 for lowering control rings 30 for removal of full bobbins. To accomplish this result, a collar 58 is mounted in fixed position on shaft 50 within and spaced from a surrounding cylindrical surface 56 in sleeve 54, said collar having a heart shaped latch member 60 pivotally mounted thereon by pivot member 62. Latch member 60 is maintained with one of its lobes 59, 61 in contact with surface 56 by radially extending pin 63 which is pressed outwardly by its spring 69 into contact with one of the angularly disposed latch surfaces 64, 66 which intersect at inner latch point 65. A recess 57 is provided on sleeve surface 56 for receiving one lobe 59 of latch 60 and preventing further angular relative movement of windlass shaft 50 and sleeve 54 in the direction of said lobe 59 while permitting relative movement in the opposite direction toward lobe 61. Latch operating elements 67, 68 are positioned angularly spaced from one another on sleeve surface 56 on each side of recess 57, and are slightly offset with respect to one another along the length of sleeve 54 so as to actuate the similarly offset lobes.

The operation of the latch mechanism is best seen from FIGS. 5 to 7. Thus, in FIG. 5, the latch mechanism is shown in its latched normal operating position with one of its lobes 59 received within recess 57 for rotating sleeve 54 in synchronism with shaft 50, sleeve 54 in effect being a countershaft for main shaft 50. In FIG. 6, latch 60 is shown in an unlatched position caused by rotating sleeve 54 relatively to windlass shaft 50 by holding windlass shaft 50 as by contact of builder cam 70 and cam follower 72 providing a ring rail stop, while rotating gear 52 by means of handle 95 or rack 91 under the influence of piston and cylinder 90 in a direction to move latch lobe 59 toward and past latch operating element 68 to operate the latch to move pin 63 from latch surface 66 to 64 and so press lobe 61 into contact with sleeve surface 56. Sleeve 54 can then be moved in the opposite direction, with lobe 61 passing beyond recess 57 without engaging it to a position past the other latch operating element 67, when the latch is again operated so that its lobe 59 is again in contact with sleeve surface 56, as is shown in FIG. 7. Movement in the same direction may continue at least until control ring bar 29 is in the fully lower position, but reverse movement will result in lobe 59 being received within recess 57 into the latched position for synchronous operation of sleeve 54 with windlass shaft 50.

*Pick motion*

The pick motion mechanism of the present invention, as best shown in FIGS. 1 and 8 through 10 provides a novel hydraulically actuated clutch release operable effectively to disconnect the traversing spinning ring rails 26, control ring bars 29 and thread guide rods 32 from the builder mechanism for additional movement of such elements to an elevated tip winding position.

Thus, the differential pick mechanism 100 herein disclosed as embodying features of the invention comprises an input differential gear 102 mounted on a sleeve member 104 which is in turn freely rotatable on an inner sleeve 106 carried on a core shaft 108 of the pick assembly. An output differential gear 110 formed with a sleeve extension 112 rotatable on the core shaft 108 is mounted in parallel relation to the input differential gear 102. Both said gears are provided with internal gear teeth, the output gear 110 having a slightly smaller number of teeth than the input gear 102. A divided planet gear 114 is arranged to mesh continuously with both said internal gears, being mounted to turn on a pivot 116 carried by an offset frame 118 attached to the inner sleeve 106 above referred to. The output gear 110 is normally connected to rotate a driving sleeve member 119 supported externally of the output gear 110 and sleeve 112 and normally connected to turn as a unit therewith— by means of a hydraulically operated clutch hereinafter to be described.

The position of the divided planet gear 114 with relation to the input differential gear 102 is controlled to impart an oscillatory movement to the output differential gear 110 and, in addition thereto, a stepped advancing movement of the output differential gear 110 with relation to the input differential gear 102 for each oscillation of the input gear 102 through connections which include a ratchet wheel 120 secured to the inner sleeve 106 to turn as a unit with the planet gear supporting frame 118. A pair of pawls 122, 124 mounted on a stationary pivot 126 are arranged when engaged with the ratchet wheel 120 to lock the ratchet wheel 120 and planet gear supporting frame 118 against rotational movement with the input differential gear 102 so that the planet gear 114 is caused to rotate on its pivot to advance the output differential gear 110 with relation to the input differential gear 102.

The operation of the pawls 122 and 124 is controlled by means of a shield 128 secured by means of a split clamp 130 to the supporting sleeve member 104 for the input differential gear 102. The shield 128 is of substantial size causing the pawls 122, 124 to be held in a raised inoperative position at all times during reciprocatory movement of the input differential gear except for a small portion of said movement at one end of the stroke when the pawls are permitted to engage the ratchet wheel 120. With this arrangement, the planet gear normally moves bodily as a unit with the two input and output differential gears 102 and 110 operating as a locking device to oscillate said gears as a unit. When the ratchet wheel 120 and planet gear supporting frame 118 are held by said engagement of said pawls 122, 124 therewith, the planet gear is rotated by the continued movement of the input differential gear 102, thus producing a small increment of advancing movement of the output differential gear 110 with relation to the input differential gear 102.

The arrangement of the pick mechanism, builder cam assembly, the windlass assembly, the compensating take-up mechanism and the several operating connections therebetween is such that the overbalancing bias imparted by the torsion bar 80 acts normally to keep the follower 72 in operative engagement with the builder cam 70, and at the same time maintains a torque strain on the elements of the differential mechanism which is normally effective to prevent rotating or walking of the planet gear 114 with relation to the input and output directional gears during the reciprocatory movement of the input differential gear 102. The means for automatically resetting the pick mechanism 100 comprises a coiled rewind torsion spring 134 which wraps around and extends along the periphery of the input and output differential gears 102 and 110, being secured at one end to a bracket 136 on the input differential gear 102 and at its other end to a bracket 138 in the driven sleeve member 119 connected to operate the windlass shaft assembly of the frame. The torsion spring 134 tends to rotate the driven sleeve member 119 in the opposite direction from the bias exerted by the compensating torsion bar 80 to a start wind position of the pick mechanism in which the bracket 138 is moved downwardly.

In the winding of bobbins 24 on the spinning frame, the continued operation of the pick mechanism 100 will cause the continuously oscillating output differential gear 110 and driven sleeve member 119 to be gradually moved ahead with relation to the continuously oscillating input differential gear 102 in the same direction as, and under the influence of the bias exerted by the compensating torsion bar 80. This movement of the driven differential gear 110 and driven sleeve member 119 with relation to the input differential gear 102 winds the reset torsion spring 134 which as above noted is of less strength than the bias exerted by the compensating torsion bar 80. At the end of the winding operation the bracket 138 will have moved ahead to about the position indicated in dot-and-dash lines in FIG. 8.

In the illustrated construction the output differential gear 110 is connected with the driven sleeve member 119, chain 78 and windlass shaft 40 by means of a hydraulically operated clutch release mechanism as follows:

The sleeve extension 112 of the output differential gear element 110 provides support for a sleeve clutch member 142 connected by a key 144 to turn with, and for a limited axial movement relative to, the sleeve extension 112 of output differential gear 110. The sleeve clutch element 142 carries a series of clutch plates 146 which are adapted for engagement with cooperating plates mounted on the driven sleeve member 119 having connected thereto the chain 78. The sleeve clutch member 142 is normally supported in clutching relation to the driven sleeve element 119 by means of a series of coiled compression springs 148 supported in recesses formed in an end face of the clutch element 142 for engagement with a ring stop member 150 backed by a locking ring 152 on the sleeve extension 112. The fluid pressure operated mechanism for releasing the clutch comprises a piston and cylinder, generally designated 160 (FIG. 12) including a ring shaped plunger 162 which is supported exterior to, and is operatively connected with the clutch member 142. The ring plunger 162 is fitted into an annular groove forming a ring shaped pressure chamber in one end face of a heavy ring support 164 which forms a part of the pick mechanism casing. Fluid pressure is supplied to the face of the ring plunger 162 through an inlet fluid pressure supply line 166 which connects with the inner face of the ring shaped pressure chamber, and is thence distributed around the periphery of said chamber in an annular recess 168. Two O-rings 170 interposed between the side walls of the ring shaped pressure chamber and the ring plunger 162 act as pressure seals. At its left hand end as shown in FIG. 8 the ring plunger 162 is connected by needle thrust bearings 172 with an abutting flange 174 which is in turn backed by a stop ring 176 fitted into a groove in the periphery of the glidable clutch sleeve 142. With this arrangement, sleeve element 119 is free to rotate under the influence of either chain 78 or torsion spring 134.

The pick motion mechanism 100 above described with its hydraulically operated clutch release to facilitate a rapid movement of the traversing elements including the ring rail 26 to the high tip winding position in general operates in the following manner:

It is assumed that the winding operation has proceeded to normal completion in which the packages or bobbins are fully wound, with the spinning ring in raised position 27–1 in FIG. 11a and in which the driven differential gear 110 is fully extended with relation to the driving differential gear 102. In this position there is normally no way in which the pick mechanism including the differential gears 102, 110 and planet gear 114 can be operated to further extend the connections between the builder cam 70 and windlass 40 to move the spinning ring from its highest builder controlled winding position at 27–1 to its tip winding position at 27–2 (FIG. 11a). At this point the clutch piston and cylinder 160 is released by applying hydraulic fluid under pressure to the cylindrically shaped clutch pressure chamber and piston 162 through line 166, thus disconnecting the driven sleeve 119 and chain 78 from the differential gears of the pick mechanism. The traversing elements including the ring rail 26 will now be moved to the extreme tip winding position in which cam member 84 is engaged against a stop bracket 139 on the input differential gear 102 under the influence of the torsion bar 80 and windlass 40 connected thereto. The rewind torsion spring 134 is thus still further extended. The windlass shaft and traversing elements will now be wound down to their doffing and starting position as hereinafter fully described. During this wind down operation the torsion reset spring 134 causes the driven sleeve member 119 and chain 78 to be moved in the rewind direction to the initial starting position in which the element 138 on the sleeve driven member 119 is engaged against the stop element 136 on the input differential gear 102. The clutch is permitted to reengage only after the completion of the tip winding operation and the traversing elements have been fully wound down by exhausting fluid pressure by the control means from the inlet pipe 166 hereinafter described causing the clutch sleeve member 160 to return to the engaged position under the influence of spring 148 and so reset.

Hydraulic circuit

Figure 12:
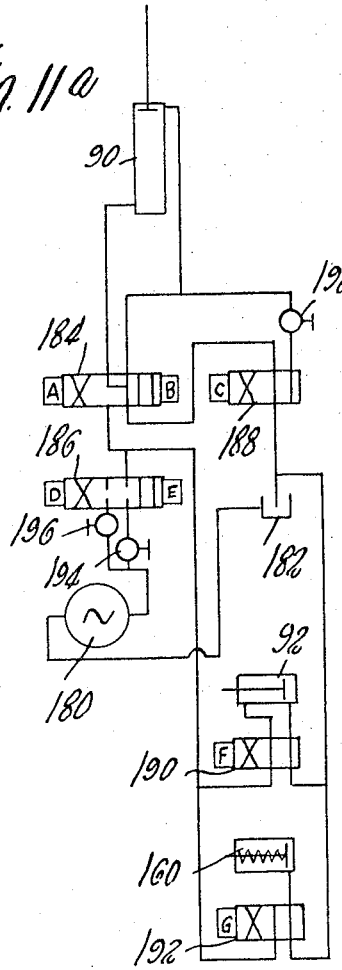

The hydraulic circuit as shown in FIG. 12 and the sequential FIGS. 13 through 20 for operating main hydraulic piston and cylinder 90, thread guide piston and cylinder 92 and pick mechanism clutch piston and cylinder 160 derives its power from hydraulic pump and motor assembly 180 which draws hydraulic fluid from hydraulic reservoir 182 and pumps it to said cylinders through a plurality of electric solenoid operated valves and adjustable orifices as controlled by cam operated switches 200–1 through 200–8 through electrical circuitry to be hereinafter described.

The valves are shown in FIG. 12 in their normal position with the frame running solely under the influence of builder cam 70. Said valves include a 3-position main cylinder valve 184 operated from its central position shown to its two energized side positions by solenoids 184–A and 184–B, respectively, a main cylinder pilot valve 186 operated from its central position shown to its two energized positions by solenoids 186–D and 186–E, respectively, a 2-position jog valve 188 operated to its energized position by solenoid 188–C, a 2-position thread guide valve 190 operated to its energized position by solenoid 190–F and a two position tip winding clutch valve 192 operated to its energized position by solenoid 192–G. Said valves are all of a type having two pairs of access lines through their housings which lines may be connected through desired flow paths by passages in the sliding valve core which may be positioned in two or three positions relatively to said access lines to provide different flow paths therebetween at predetermined times to cycle cylinders 90, 92 and 160 as desired. The structures of suitable valves is well understood and hence need not be further explained herein except as to their function as hereinafter appears.

For adjustably controlling the speed of movement of the spinning ring rail and rings 27, both during wind down and during jogging, as is hereinafter explained in more detail, three adjustable orifices are included in the hydraulic circuit, wind down orifice 194 and jog orifices 196 and 198, such being appropriately connected through valves 184, 186 and 188 to main piston and cylinder 90. The structure of such orifices is well known, and hence need not be further explained herein except as to their function in connection with the operation of the spinning frame which follows.

Electrical circuit

The electrical circuit for operating hydraulic valve solenoids 184A and B, 186D and 188C, 190F and 192G as well as main frame motor 25 and hydraulic pump and motor assembly 180 is shown in FIG. 21.

In general, it includes, connected between power terminals 208 and 210, in addition to said solenoids and motors, windlass cam driven switches 200–1 through 200–8, stop, start and restart switches 202, 204 and 206, respectively, and relays 211 through 220 with their contacts similarly numbered with further identifying reference numerals. A complete description thereof appears in the description of the operation of the entire spinning frame of the invention which follows immediately.

Operation

The operation of the spinning frame above described, insofar as concerns the movement of its traversing yarn guiding and winding elements—spinning rings 27, control rings 30 and thread guides 34—relatively to a spindle 23 and bobbin 24, is shown in sequential steps in FIGS. 11a, b, and c, cam operated switches 200–1 to 200–8 and restart switch 206 also being included in the sequence since the steps thereof are initiated by such switches. For clarity, the yarn guiding and control elements in FIGS. 11a, b and c are numbered with additional identifying numerals which correspond to their position following operation by each one of the switches numbered 200–1 through 8, the path of motion of spinning ring 27 is shown as a dotted line, and the corresponding hydraulic diagram of FIGS. 12 to 20 of the hydraulic circuit in the particular condition effected by the operation of one of said swtiches is positioned below the appropriate sequential step of FIG. 11a, b and c.

Referring now to FIG. 11a, FIG. 12 and FIG. 21, the various elements are shown in their normal operating condition under the sole influence of builder cam 70 and pick mechanism 100, as biased by the torsion bar 80 which acts as a counter force mechanism, the main shaft 50 and sleeve countershaft 54 of windlass 40 being latched for oscillating movement in synchronism and pick mechanism clutch engaged so that the spinning frame is operating in a conventional manner approaching a fully wound bobbin condition with the spinning ring 27 being reciprocated along the upper end of bobbin 24 and gradually being advanced upwardly therealong by the pick mechanism 100. The switch cam shaft 97 is being similarly reciprocated.

When the bobbin 24 has been wound to the extent desired, such will be sensed by the present condition of switch cam 98–1, which will at that time have advanced far enough to operate normally open switch 200–1 and begin the operation of the spinning frame mechanism with which the present invention is concerned.

Switch 200–1 starts the hydraulic pump motor 180 through contacts 212–1 by energizing relay 212 through normally closed contacts 219–5 and normally closed switch 200–5. It also operates parallel contact 212–2 to keep relay 212 energized when switch 200–1 is released.

The position of the ring rail 27–1 (FIG. 11a) is shown in its normally most elevated position at this time, a more elevated position being achieved only if tip winding is to be used.

Figure 13:
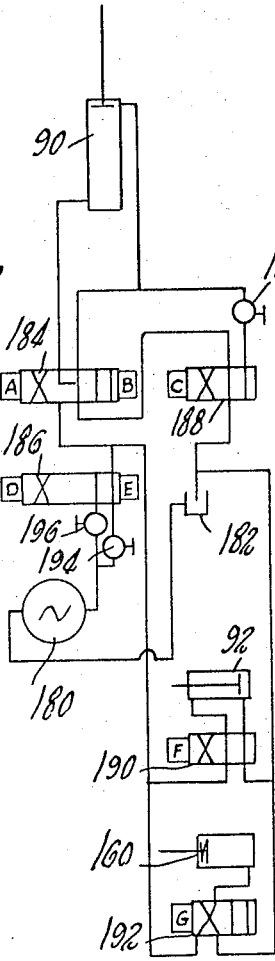

Switch 200–2 operates upon the next builder motion cycle to energize relay 213 by reason of the previous closing of contacts 212–2. Its contacts 213–4 energize solenoid 186–E to provide hydraulic fluid to the input ports of the other valves. Relay 213 operates contacts 213–1 to maintain itself energized. Its contacts 213–3 energize pick mechanism clutch solenoid 192–G for flow of hydraulic fluid to pick mechanism clutch piston and cylinder 160 to disengage its clutch so that the spinning ring will be raised to a higher position at 27–2, as explained above with reference to the operation of pick mechanism 100, for winding a number of turns of yarn on the tip of the bobbing at 24–2. FIG. 13 shows the hydraulic circuit in this condition with the tip winding position of the spinning ring being shown at 27–2 of FIG. 11a.

Figure 14:
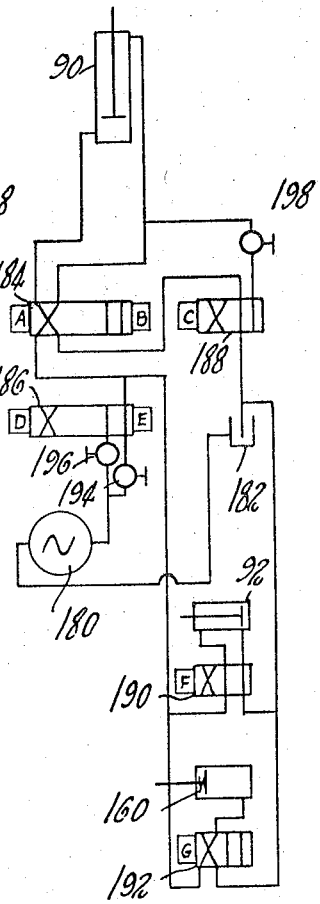

After a predetermined time for winding the desired number of tip turns, time delay contacts 213–2 operate to energize relay 214 which locks itself in by contacts 214–1. Contacts 214–2 close and energize solenoid 184–A. Contacts 214–3 have no function at this time since they are in parallel with contacts 213–4 which are already closed. Contacts 214–4 also close but have no function at this point. Solenoid 184–A moves valve 184 to provide hydraulic fluid under pressure to the top of windlass piston 90 to move the spinning ring down, the hydraulic fluid passing through adjustable windown orifice 194 so that the speed of windown and hence the number of turns of yarn wound on bobbin 24 during windown can be predetermined. FIG. 14 shows the hydraulic circuit in this condition.

About this time contacts 214–5 open to cut off power to main frame motor 25 which causes the spindle at position 23–3 to slow down and stop after the spinning ring reaches its lowered bottom position at 27–3 to provide a few wraps of yarn around the bottom of the spindle at 27–3 so that the spindle can subsequently be restarted with a new bobbin without the necessity of piecing up the yarn.

When the spinning ring reaches its bottom position at 27–3, as shown in FIG. 11a, switch 200–3 is operated by its cam 98–2. It energizes relay 215 which latches in through contacts 215–2. Contacts 215–1 open, deenergizing solenoid 186–A which shifts valve 186 to stop hydraulic piston and cylinder 90 in its lowered position (FIG. 15). Contacts 215–3 are closed but are without power since contacts 215–1 are open. When relay 215 times out to give main frame motor 25 time to stop, contacts 215–4 are opened, deenergizing solenoid 192–G to move valve 192 for release of hydraulic fluid from pick mechanism piston and cylinder 160 for reengagement of its clutch (FIG. 15) in the reset condition of the pick mechanism. Solenoid 186–E of valve 186 is also deenergized at this time. Contacts 215–5 then close to energize solenoid 184–B through contacts 214–6, 215–5, 216–1, and 215–3, and solenoid 186–E is again energized. The energization of solenoids 184–B and 186–E shifts valves 184 and 186 and causes main cylinder 90 to go up (FIG. 16), lifting the control ring and spinning ring to positions at 30–4 and 27–4 (FIG. 11b) until the ring rail 27 is stopped by builder cam follower 72 having come into contact with builder cam 70 (FIG. 1) while the control ring bar 29 continues to rise. Relative movement is thus produced between the windlass main shaft 50 and sleeve countershaft 54, operating releasable latch 60 to swing it to its unlatched position and release it as explained above in connection with the operation of windlass 40 (FIGS. 5–7).

After control ring bar 29 has been raised beyond the unlatch point, cam 98–4 operates switch 200–4 which energizes relay 216, which latches in through its contacts 216–2. Contacts 216–3 also close but nothing happens at this point because contacts 215–4 are open. Contacts 216–1 open, dropping out solenoid 184–B, shifting valve 184 which stops further upward movement of main cylinder 90. Contacts 216–5 then close, energizing solenoid 188–C through closed contacts 214–4. Valve 188 is thus shifted, opening up a bypass through adjustable orifice 198 so hydraulic fluid can flow from main cylinder 90 as the control ring drops by gravity to a lowered position at 30–5 adjacent to the spinning ring position at 27–5 for bobbin clearance. At the same time solenoid 190–F is operated by contacts 216–5, shifting valve 190 for flow of pressurized hydraulic fluid to thread guide cylinder 92, tilting the thread guide arm back to a raised thread guide position at 34–5. The condition of the hydraulic circuit at this point appears in FIG. 17. When the control ring reaches its down position, at 30–5 (FIG. 11b), switch 200–5 is operated, since the rotation of its cam shaft 97 is synchronized with that of windlass sleeve 54. Switch 200–5 stops hydraulic pump motor 180, and drops out contacts 212–2 and relays 213, 214 and 215 so their contacts shift.

The frame is now in condition to be doffed by either manual or machine replacement of the full bobbins with empty bobbins, the spinning ring, control ring, and thread guide being positioned for bobbin clearance at 27–5, 30–5, and 34–5, respectively, as shown in FIG. 11b.

Figures 18, 19, 20:
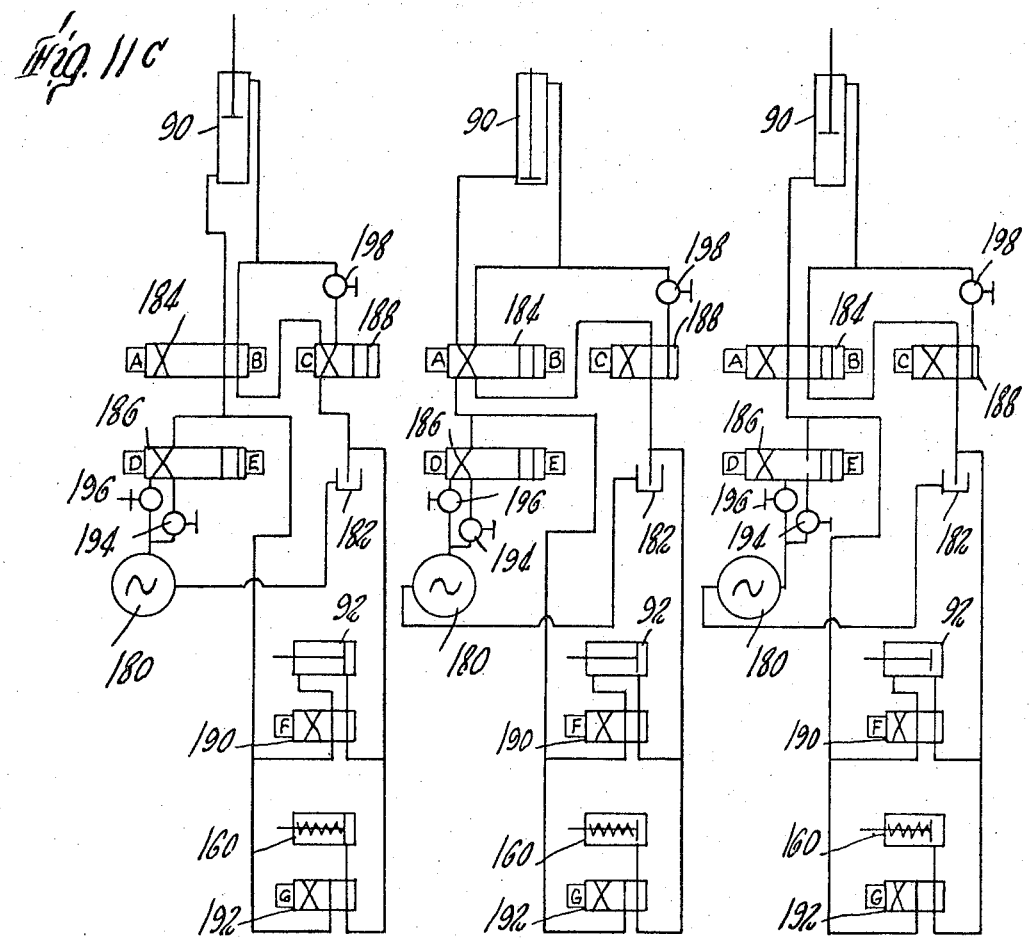

With the full bobbins replaced by empty bobbins, the frame is restarted by pushing restart switch 206 either manually or by the automatic doffer. This energizes relays 217 and 218, locking them in through contacts 217–1 and 218–1. Contacts 218–2 and 217–2 also close to energize relay 212 to start hydraulic pump and motor 180 through its contacts 212–1. Contacts 218–1 close energizing solenoid 186–D, operating valve 186 so that hydraulic fluid under pressure passes through the adjustable jog down control orifice 196. Contacts 217–4 open, deenergizing solenoid 190–F and shifting valve 190 to operate thread guide cylinder 92 to return the thread guide to its normal position at 34–6. Contacts 217–3 close energizing solenoid 184–B and shifting valve 184. This causes main cylinder 90 to go up, raising the control ring bar 29 and rotating windlass sleeve 54 relatively to its shaft 50 until latch 60 operates to once more latch the windlass elements upon being received in its recess 57. Further raising of cylinder 90 rotates cam shaft 97 sufficiently to close switch 200–6 which operates relay 219 which locks in through its contacts 219–4. Contacts 219–1 open, deenergizing solenoid 184–B, shifting valve 184 and stopping further upward motion of cylinder 90. FIG. 18 shows the hydraulic circuit at this point and FIG. 11c the raised spinning ring at 27–6, control ring at 30–6 and thread guide at 34–6. Contacts 219–2 close, restarting main frame drive motor 25 to again rotate spindles 23 and builder cam 70.

With the frame starting up to wind yarn onto the empty bobbins, the jogging of the spinning rings is initiated between spinning ring positions 27–7 and 27–8 (FIG. 11c) to prevent yarn breakage as the spindles accelerate to full speed. This takes place upon the closing of contacts 219–3 energizing solenoid 184–A and shifting valve 184 which causes main cylinder 90 slowly to go down, with fluid passing through the adjustable down jog orifice 196 to the bottom winding position of the spinning ring at 27–7 (FIGS. 19 and 11c) until switch 200–7 is operated.

Switch 200–7 energizes relay 220 which latches in through its contacts 220–1. Its contacts 220–2 open, deenergizing solenoid 184–A and shifting valve 184 which stops cylinder 90. Contacts 220–4 close, energizing solenoid 188–C, shifting valve 188 which bypasses hydraulic fluid through the adjustable up jog orifice 198. Contacts 220–3 close, energizing solenoid 184–B which shifts valve 184 and causes main cylinder 90 to go up, but slowly, at a predetermined rate since the hydraulic fluid must pass through adjustable up jog orifice 198. FIG. 18 shows this condition of the hydraulic circuit.

Switch 200–8 operates at the top of cylinder travel, and deenergizes relay 220, the contacts 220–1 of which deenergize solenoid 184–B, shifting valve 184; contacts 220–4 deenergize solenoid 188–C, shifting valve 188, and contacts 220–2 energize solenoid 184–A, which shifts valve 184 causing piston and cylinder 90 to go down until switch 200–7 again operates, this down condition of the hydraulic circuit being shown in FIG. 19.

This jogging cycle as controlled by switches 200–7 and 200–8 repeats for a limited time until timer relay 219 times out, upon which occurrence its contacts 219–5 open, shutting off hydraulic motor 180 and resetting all contacts for next doff cycle.

The spinning frame continues running under effect of builder cam 70 alone, with cylinder 90 deenergized as shown in FIG. 20 until switch 200–1 is again actuated.

It will be apparent to those skilled in the art that the spinning, twisting and the like frame of the invention is susceptible to modification. For example, it is contemplated that the tip winding function may not be needed in a particular frame, in which case its operating elements including the pick mechanism clutch and its controls may be omitted. Certain aspects of the invention are applicable to other types of textile frames than that described, for example, in which the spindles rather than the spinning rings are traversed, and in such case the control rings and their operating elements and controls are unnecessary. Other elements, such as the positioning of control switches and the type of fluid drive may also be modified, all of the above recited modifications and others as well being within the scope of the invention and the appended claims.

What is claimed is:

1. In a spinning frame and the like having means for building bobbins, including spindles, bobbins on said spindles, movable yarn traversing and guiding elements and means for rotating said spindles,
   in combination with control means and operating mechanism comprising:
   means to produce traversing movement of said yarn traversing and guiding elements relative to said spindles and bobbins to build said bobbins,
   means operable when said bobbins are fully built automatically to shift said yarn traversing and guiding elements to a bottom winding position beyond the bobbins to wind yarn around the spindles,
   means operable automatically to stop rotation of said spindles after winding yarn around said spindles,
   means operable automatically to shift said yarn traversing and guiding elements to a bobbin doffing position after stopping rotation of said spindles,
   means operable to start rotation of said spindles after replacing full bobbins with empty bobbins,
   means operable automatically to shift said yarn traversing and guiding elements to an initial bobbin winding position before rotation of said spindles substantially begins, and means operable automatically to jog said yarn traversing and guiding elements upon initiation of rotation of said spindles.

2. In a spinning frame and the like as claimed in claim 1, further including
   means operable when said bobbins are fully built automatically to shift said yarn traversing and guiding elements to a tip winding position at the upper tips of the bobbins to wind yarn around the upper tips of the bobbins.

3. In a spinning frame and the like having means for building bobbins including spindles, bobbins on said spindles, yarn traversing and guiding elements including spinning rings and yarn control rings, and means for rotating said spindles, in combination with automatic control and operating mechanism comprising:
   means producing traversing movement of said yarn traversing and guiding elements relative to said spindles and bobbins to build said bobbins,
   means operable when said bobbins are fully built automatically to shift said spinning rings to a tip winding position at the upper tips of the bobbins to wind yarn around the upper tips of the bobbins,
   means operable automatically to shift said spinning rings to a bottom winding position beyond the bobbins to wind yarn around the spindles,
   means operable automatically to stop rotation of said spindles after winding yarn around said spindles,
   means operable automatically to shift said spinning rings to a bobbin doffing position after stopping rotation of said spindles,
   means operable automatically to lower said control rings independently of said spinning rings to a lowered position adjacent said spinning rings facilitating removal of full bobbins from said spindles,
   means operable to start rotation of said spindles and said means producing said traversing movement after replacing full bobbins with empty bobbins,
   means operable automatically to shift said spinning rings to an initial bobbin winding position,
   means operable automatically to shift said control rings to an initial bobbin winding position after operation of said means operable to start rotation of said spindles and before rotation of said spindles substantially begins, and
   jogging means operable automatically to jog said elements upon initiation of rotation of said spindles.

4. In a spinning frame and the like as claimed in claim 3, wherein said yarn traversing and guiding elements further include thread guides having a first position during building of said bobbins, further including
   means operable automatically to move said thread guides to a second position remote from their first position facilitating removal of full bobbins from said spindles, and
   means operable automatically to shift said thread guides to said first position after operation of said means operable to start rotation of said spindles.

5. In a spinning frame and the like having means for building bobbins including spindles, bobbins on said spindles, yarn traversing and guiding elements including spinning rings and yarn control rings, and means for rotating said spindles, in combination with automatic control and operating mechanism comprising:
   means producing traversing movement of said yarn traversing and guiding elements relative to said spindles and bobbins to build said bobbins,
   means operable when said bobbins are fully built automatically to shift said spinning rings to a bottom winding position beyond the bobbins to wind yarn around the spindles,
   means operable automatically to stop rotation of said spindles after winding yarn around said spindles,
   means operable automatically to shift said spinning rings to a bobbin doffing position after stopping rotation of said spindles,
   means operable automatically to lower said control rings independently of said spinning rings to a lowered position adjacent said spinning rings facilitating removal of full bobbins from said spindles,
   means operable to start rotation of said spindles and said means producing said traversing movement after replacing full bobbins with empty bobbins, means operable automatically to shift said spinning rings to an initial bobbin winding position, means operable automatically to shift said control rings to an initial bobbin winding position after operation of said means operable to start rotation of said spindles and before rotation of said spindles substantially begins, and jogging means operable automatically to jog said elements upon initiation of rotation of said spindles.

6. In a spinning frame and the like having means for building bobbins including spindles, bobbins on said spindles, yarn traversing and guiding elements including spinning rings and yarn control rings, and means for rotating said spindles, in combination with automatic control and operating mechanism comprising:

means producing traversing movement of said yarn traversing and guiding elements relative to said spindles to build said bobbins, means operable when said bobbins are fully built automatically to shift said spinning rings to a bottom winding position beyond the bobbins to wind yarn around the spindles, means operable automatically to stop rotation of said spindles after winding yarn around said spindles, means operable automatically to shift said spinning rings to a bobbin doffing position after stopping rotation of said spindles, means operable automatically to lower said control rings independently of said spinning rings to a lowered position adjacent said spinning rings facilitating removal of full bobbins from said spindles, means operable to start rotation of said spindles and said means producing said traversing movement after replacement of full bobbins with empty bobbins, means operable automatically to shift said spinning rings to an initial bobbin winding position, and means operable automatically to shift said control rings to an initial bobbin winding position after operation of said means operable to start rotation of said spindles.

7. In a spinning frame and the like having means for building bobbins including spindles, bobbins on said spindles, yarn traversing and guiding elements including spinning rings, and means for rotating said spindles, in combination with automatic control and operating mechanism comprising:

builder means producing traversing movement of said yarn traversing and guiding elements relative to said spindles and bobbins to build said bobbins, means operable when said bobbins are fully built automatically to shift said spinning rings to a tip winding position at the upper tips of the bobbins to wind yarn around the upper tips of the bobbins, means operable after tip winding said bobbins automatically to shift said spinning rings to a bottom winding position beyond the bobbins to wind yarn around the spindles, means operable automatically to stop rotation of said spindles after winding yarn around said spindles, means operable automatically to shift said spinning rings to a bobbin doffing position, means operable automatically to shift said spinning rings to an initial bobbin winding position from said bobbin doffing position after replacing full bobbins with empty bobbins, and means operable to start rotation of said spindles and said means producing said traversing movement.

8. In a spinning frame and the like having means for building bobbins including spindles, bobbins on said spindles, yarn traversing and guiding elements including spinning rings, and means for rotating said spindles, in combination with automatic control and operating mechanism comprising builder motion means producing traversing movement of said yarn traversing and guiding elements relative to said spindles and bobbins to build said bobbins, means operable when said bobbins are fully built automatically to shift said spinning rings to a bottom winding position beyond the bobbins to wind yarn around the spindles, means operable automatically to stop rotation of said spindles after winding yarn around said spindles, means operable automatically to shift said spinning rings to a bobbin doffing position, means operable automatically to shift said spinning rings to an initial bobbin winding position from said bobbin doffing position after replacing full bobbins with empty bobbins, means operable to start rotation of said spindles and said builder motion means producing said traversing movement and jogging means operable automatically to jog said spinning rings upon initiation of rotation of said spindles imparting a limited vibratory movement thereto adjacent said initial bobbin winding position for a limited time as said builder motion means initiates its traversing movement.

9. In a spinning frame and the like having means for building bobbins including spindles, bobbins on said spindles, yarn traversing and guiding elements including spinning rings and yarn control rings, and means for rotating said spindles, in combination with operating mechanism comprising:

means to provide traversing movement of said spinning rings and yarn control rings relative to said spindles and bobbins to build said bobbins including a builder motion mechanism, a counter force mechanism, a windlass mechanism having a main shaft, a countershaft rotatable relative thereto, releaseable means normally connecting said shafts for rotation of said countershaft with said main shaft and release means for releasing said releasable means for relative rotation of said main shaft and countershaft, connecting means between said builder motion mechanism and said counter force mechanism with the main shaft of said windlass mechanism connected therein for oscillating said main shaft in synchronism with said builder motion mechanism, connecting means between said windlass mechanism main shaft and said spinning rings for traversing said spinning rings in synchronism with said main shaft, connecting means between said windlass mechanism countershaft and said yarn control rings for traversing said yarn control rings in synchronism with said countershaft, countershaft operating means for operating said windlass countershaft independently of said main shaft, said countershaft operating means rotating said countershaft for traversing said control rings independently of said spinning rings upon release of said releasable means by said release means to lower said control rings to a lowered position adjacent said spinning rings facilitating removal of full bobbins from said spindles.

10. In a spinning frame and the like as claimed in claim 9, wherein said countershaft operating means includes power means for rotating said countershaft independently of said main shaft.

11. In a spinning frame and the like as claimed in claim 9, further including stop means preventing rotation of said windlass mechanism main shaft beyond a main shaft position corresponding to a maximum raised position of said spinning rings, and wherein said release means operates said releasable means upon rotation of said countershaft means in one direction to a countershaft position beyond said main shaft position, said countershaft upon operation of said releasable means being free to move relatively to said main shaft in the opposite direction to said one direction for movement of said control rings by gravity to said lowered position.

12. In a spinning frame or the like as claimed in claim 11, wherein said releasable means includes a two position latch means operating in said one direction alternately to release and to connect said shafts.

13. In a spinning frame or the like as claimed in claim 12, wherein said countershaft is a sleeve surrounding said main shaft, and said latch means is interposed therebetween.

References Cited by the Examiner
UNITED STATES PATENTS

| | | | |
|---|---|---|---|
| 2,982,487 | 5/1961 | Newton | 242—26.1 |
| 3,072,350 | 1/1963 | Anderson et al. | 242—26.1 |
| 3,074,224 | 1/1963 | Kennedy et al. | 242—26.41 |
| 3,075,342 | 1/1963 | Lohest et al. | 57—99 X |
| 3,080,701 | 3/1963 | Kennedy et al. | 242—26.4 X |
| 3,101,585 | 8/1963 | Andersen et al. | 242—26.1 X |
| 3,113,414 | 12/1963 | Eizaburo Negishi | 57—99 X |
| 3,124,925 | 3/1964 | Kennedy et al. | 57—54 |
| 3,231,209 | 1/1966 | Pray et al. | 242—26.4 |

STANLEY N. GILREATH, *Primary Examiner.*